(No Model.)
2 Sheets—Sheet 1.

E. S. KEELER.
SEED PLANTER.

No. 454,216. Patented June 16, 1891.

WITNESSES
M. B. Harris
J. C. Wilson

INVENTOR
Elisha S. Keeler
by
Whitman + Wilkinson
Attorneys (No Model.) 2 Sheets—Sheet 2.
E. S. KEELER.
SEED PLANTER.
No. 454,216. Patented June 16, 1891.
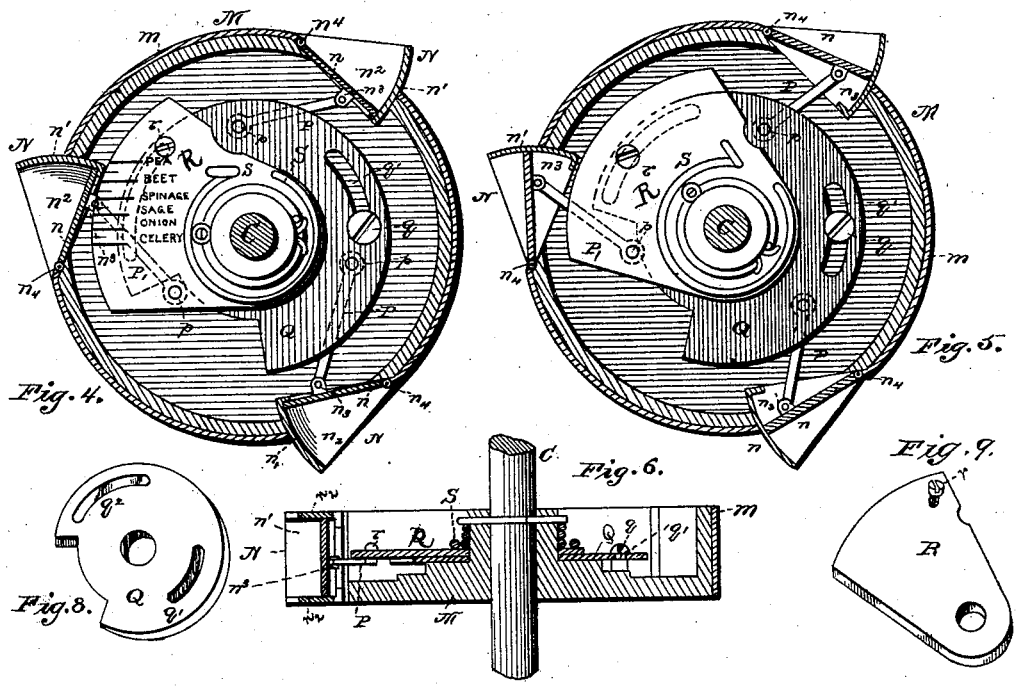
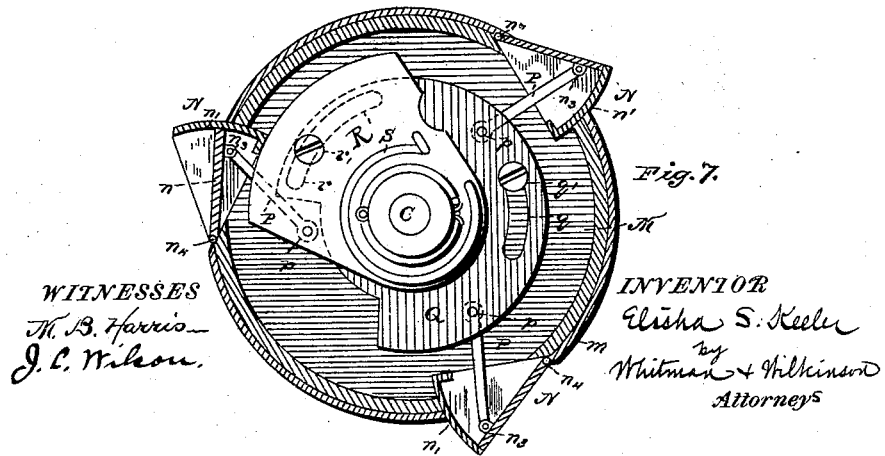
WITNESSES
M. B. Harris
J. C. Wilson
INVENTOR
Elisha S. Keeler
by Whitman & Wilkinson
Attorneys

UNITED STATES PATENT OFFICE.

ELISHA S. KEELER, OF TOPEKA, KANSAS.

SEED-PLANTER.

SPECIFICATION forming part of Letters Patent No. 454,216, dated June 16, 1891.

Application filed February 25, 1891. Serial No. 382,735. (No model.)

*To all whom it may concern:*

Be it known that I, ELISHA S. KEELER, a citizen of the United States, residing at Topeka, in the county of Shawnee and State of Kansas, have invented certain new and useful Improvements in Seed-Planters; and I do hereby declare the following to be a full, clear, and exact description of the invention, such as will enable others skilled in the art to which it appertains to make and use the same.

My invention consists of certain improvements in seeders and planters; and it has for its object the providing of a machine which can be readily adjusted for planting different kinds of seeds or grains and for planting in drills or in hills at a desired distance apart.

Reference is had to the accompanying drawings, wherein the same parts are indicated by the same letters.

Figure 1:
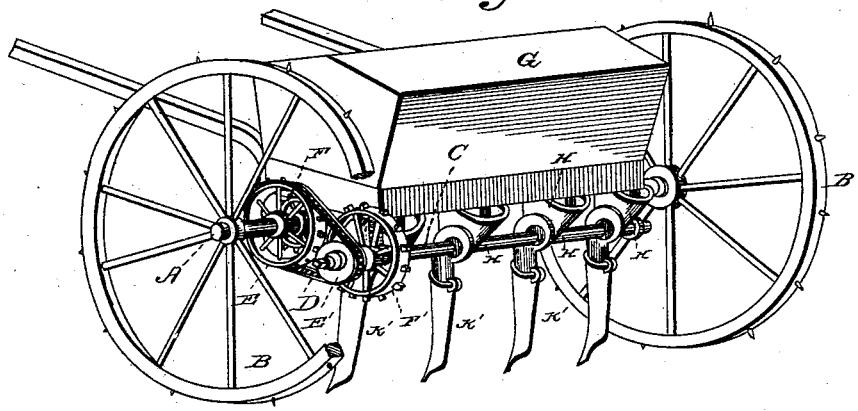
Figure 2:
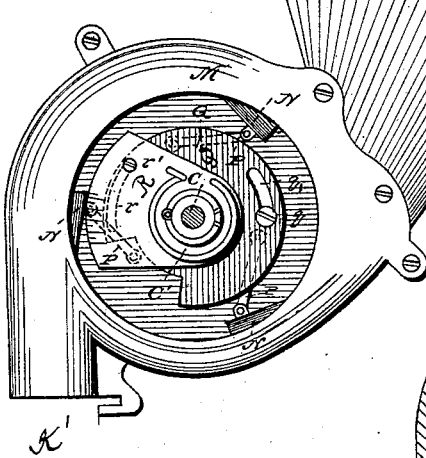
Figure 3:
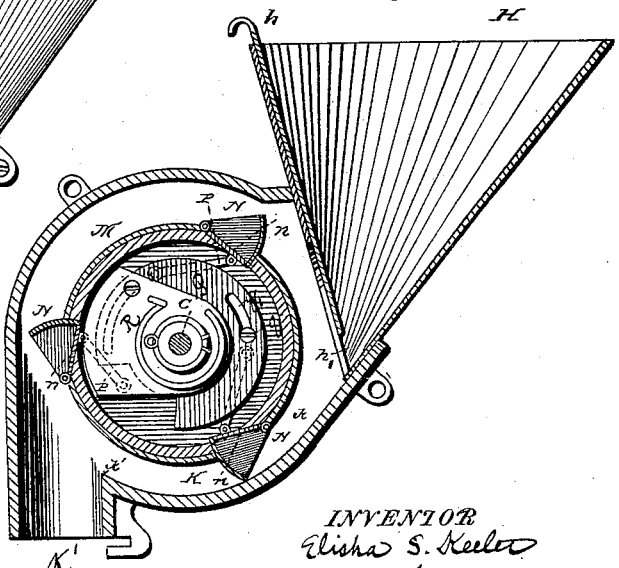

Figure 1 shows a perspective view of a seed-drill according to my invention and capable of planting four rows at a time. Fig. 2 represents a profile view of a portion of a single-row planter according to my invention. Fig. 3 represents a vertical longitudinal section. Figs. 4 and 5 represent vertical views, partly in section, of my revolving seed-cups and adjusting apparatus, as suited for single-row planters. Fig. 6 represents a transverse section of the same. Fig. 7 represents a similar view to those of Figs. 6 and 7, but adjusted so that but one seed-cup is in operation. Figs. 8 and 9 represent my adjusting-plates for the single-row planter.

The various hoppers, conducting-tubes, &c., may be mounted either on the same shaft A with the driving-wheels B or on a separate shaft C, and either geared to the first shaft or connected thereto by a chain D and sprocket-wheels E and E' and F and F'. I prefer to use a separate shaft with two sets of sprocket-wheels arranged so that the same chain may be used for either set. In this way I obtain greater variations in the comparative speed of the driving-wheels and feeding-wheels. The shaft C is journaled in the frame-work of the machine in any convenient way.

G represents a box for carrying grain, from which the hoppers are filled.

H represents a hopper having converging sides, with its smaller end downward. At the rear end of said hopper is a slide $h$, serving as a means of cutting off the flow of seed from the hopper to the feed-wheel when the planter is being moved to or from the field. The flow of seed from the hopper is regulated by the backing up of seed in the opening $h'$ whenever the chamber is full to a level with the top of the opening $h'$. This feed-wheel has a number of adjustable buckets N on its periphery. The channel or throat $k$ extends from the opening $h'$ at the base of the slide $h$ to a point $k'$ considerably beyond the point directly beneath the shaft or axis of the feed-wheel. This throat is curved to correspond nearly with the line described by the outer end of the revolving seed-buckets, and constitutes a channel in which the seed or grain coming from the opening $h$ is met and taken up by the buckets N, carried over the feed-wheel, and dropped into the conducting-tooth K'. At the point $k'$ where the buckets enter the said channel or throat it is made of such width and depth that the seed-cups in passing will fill or fit the channel as nearly as practicable without friction. From the point of entrance toward the base of the hopper the throat is made gradually wider and deeper, so that (independent of buckets) the three sides of the channel and the periphery of the feed-wheel constitute a curved contracting passage with its smaller end at $k'$ and its larger end between the rear face of the hopper and the feed-wheel. The said channel is made to extend far enough beyond the vertical line through the shaft so that by reason of its curve upward no seed or grain will reach the opening at the smaller end. This channel may, if preferred, be of uniform size from $k'$ a part of the distance toward the opening $h'$.

Each bucket N is composed of an adjustable bottom $n$, a curved side $n'$, and two straight sides $n^2$.

I preferably inclose the feeding-wheel M in a brass ring or casing $m$, to which the adjustable bottoms $n$ are pivoted, and integral with or attached to which are the curved sides $n'$. The curve of $n'$ is struck with the pivot $n^4$ as a center and the length of $n$ as a radius, so that the bottom $n$ may always move freely along and yet fit snugly in the said curved plates $n'$. Rods P are connected to plates Q and R, surrounding the axle C.

Figs. 4, 5, 6, 7, 8, and 9 represent the device for adjusting the buckets for single-row planters or where each one of several feed-wheels is set separately. When the feed-wheels are each to be adjusted singly, I provide two sliding plates Q and R, to which the inner ends of the adjusting-rods P are hinged. Plate Q is clamped to the feed-wheel M by a broad-headed screw $q$. Said screw passes through a slot $q'$ through the sliding plate, so that by loosening the screw the plate may be slid around, as desired, and when in position may be again clamped.

$q^2$ is a slot in Q for the clamp-screw $r$ to enter.

The sliding plate Q has pivotally secured thereto the inner ends of two of the adjusting-rods P, while the third rod P' is pivotally secured to the sliding plate R. Plate R has a clamp-screw $r$, which passes through a curved slot $q^2$ in the lower plate Q and clamps the two plates together. This plate R carries a graduated scale, which may be marked "Pea," "Beet," "Spinach," &c., and is set by having the plate Q suitably clamped by means of the screw $q$ and then adjusting the plate R by means of the screw $r'$.

It will be seen that when plate R is clamped to plate Q in such manner that all of the seed-cups are opened or closed to the same extent, and are practically connected to one adjusting-plate, then if plate Q is clamped with the screw $q$ at one end of the slot $q'$ the buckets will be opened to their fullest capacity, but if clamped with the screw at the other end of the slot $q'$ the buckets will be closed.

In Fig. 4 all the buckets are represented as opened to their greatest capacity, (shown in Fig. 5,) the buckets are half closed, while in Fig. 7 the two buckets connected to Q are closed and the one connected to R is half-open. Thus it will be seen that by using only one bucket to sow seed and by adjusting the relative speed of the feed-wheel and drive-wheels the machine may be used to plant in hills at any reasonable distance apart. It will also be evident that I may increase or diminish the number of buckets or seed-cups, arrange alternate ones to the sliding plates, respectively, or connect them irregularly in a variety of ways.

S represents a spring to hold the two plates firmly onto the feed-wheel and to prevent their shaking loose from the jarring to which the machine is subjected.

Having thus described my invention, what I claim, and desire to secure by Letters Patent of the United States, is—

1. In a seed-planter, the combination, with a revolving shaft, of a feed-wheel mounted thereon, a plurality of seed-cups mounted in the periphery of the said wheel, hinged bottom plates in the said cups, rods pivoted to the interior of said cups, and two adjustable collars or plates attached to the opposite ends of the said rods, respectively, substantially as described.

2. In a seed-planter, the combination of the shaft C, feed-wheel M, buckets N, bottom plates $n$, rods P and P', plate Q, slotted at $q'$ and $q^2$, plate R, and clamp-screws $q$ and $r$, substantially as described.

3. In a seed-planter, the combination of the shaft C, feed-wheel M, ring $m$, buckets N, bottom plates $n$, rods P and P', plate Q, slotted at $q'$ and $q^2$, plate R, clamp-screws $q$ and $r$, and spring S, substantially as described.

4. In a seed-planter, the combination of a hopper H, tapering downward and having an opening $h'$ near the bottom thereof, with a chamber K, a feed-wheel M, set eccentrically therein and forming a contracted passage curving upward at both ends beneath the said feed-wheel, and buckets mounted on the periphery of said feed-wheel and fitting closely in the smaller portion of said passage, substantially as described.

5. In a seed-planter, the combination, with the hopper H, of the chamber K, feed-wheel M, adjustable buckets N, curved passage $k'$ $k$, and discharge-passage K', substantially as described.

In testimony whereof I affix my signature in presence of two witnesses.

ELISHA S. KEELER.

Witnesses:
HENRY KEELER,
W. H. JACOBY.